(12) United States Patent
Lee et al.

(10) Patent No.: US 10,404,493 B2
(45) Date of Patent: Sep. 3, 2019

(54) METHOD FOR ESTIMATING CHANNEL BY BASE STATION IN MOBILE COMMUNICATION SYSTEM AND DEVICE THEREFOR

(71) Applicant: Samsung Electronics Co., Ltd., Suwon-si, Gyeonggi-do (KR)

(72) Inventors: Ikbeom Lee, Seongnam-si (KR); Hayoung Yang, Yongin-si (KR); Joohyun Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/561,789

(22) PCT Filed: Apr. 11, 2016

(86) PCT No.: PCT/KR2016/003803
§ 371 (c)(1),
(2) Date: Sep. 26, 2017

(87) PCT Pub. No.: WO2016/163857
PCT Pub. Date: Oct. 13, 2016

(65) Prior Publication Data
US 2018/0083803 A1   Mar. 22, 2018

(30) Foreign Application Priority Data
Apr. 10, 2015  (KR) .................... 10-2015-0051044

(51) Int. Cl.
*H04L 25/02* (2006.01)

(52) U.S. Cl.
CPC .......... *H04L 25/0224* (2013.01); *H04L 25/02* (2013.01); *H04L 25/024* (2013.01)

(58) Field of Classification Search
CPC .... H04L 25/0224; H04L 25/024; H04L 25/02
See application file for complete search history.

(56) References Cited

U.S. PATENT DOCUMENTS

| | | | |
|---|---|---|---|
| 8,718,194 B2* | 5/2014 | Doan | ........... H04L 25/0256 375/219 |
| 2008/0016425 A1* | 1/2008 | Khan | ........... H03M 13/2957 714/755 |
| 2009/0177954 A1* | 7/2009 | Takahashi | ........... H04L 1/0045 714/819 |
| 2010/0105317 A1 | 4/2010 | Palanki et al. | |
| 2010/0192035 A1 | 7/2010 | Sagfors et al. | |

(Continued)

FOREIGN PATENT DOCUMENTS

| | | |
|---|---|---|
| KR | 10-2010-0021475 A | 2/2010 |
| KR | 10-2011-0082054 A | 7/2011 |

(Continued)

*Primary Examiner* — Afshawn M Towfighi
(74) *Attorney, Agent, or Firm* — Jefferson IP Law, LLP

(57) ABSTRACT

The present disclosure relates to a method for estimating a channel in an uplink. A method for estimating a channel by a base station according to the present disclosure is characterized by comprising the steps of: continuously receiving at least one subframe; selecting the number of subframes to be used for channel estimation from the received subframes and extracting subframes based on the number of subframes; and performing channel estimation using reference signals in the extracted subframes.

12 Claims, 6 Drawing Sheets

(56) References Cited

U.S. PATENT DOCUMENTS

| | | | | |
|---|---|---|---|---|
| 2011/0205954 | A1* | 8/2011 | Gorokhov | H04L 5/0007 |
| | | | | 370/315 |
| 2012/0263247 | A1 | 10/2012 | Bhattad et al. | |
| 2013/0235818 | A1* | 9/2013 | Yuan | H04L 25/0202 |
| | | | | 370/329 |
| 2015/0304074 | A1* | 10/2015 | Seo | H04W 74/002 |
| | | | | 370/329 |
| 2018/0069652 | A1* | 3/2018 | Yamamoto | H04L 5/0051 |

FOREIGN PATENT DOCUMENTS

| | | |
|---|---|---|
| KR | 10-1310608 B1 | 9/2013 |
| KR | 10-2014-0037692 A | 3/2014 |
| KR | 10-2014-0134720 A | 11/2014 |
| WO | 2014/098483 A1 | 6/2014 |

* cited by examiner

FIG. 2C $\overbrace{261}$
WINDOW SIZE = 1

TTI0 : TTI0
TTI1 : TTI1
TTI2 : TTI2
TTI3 : TTI3

$\overbrace{263}$
WINDOW SIZE = 2

TTI0 : TTI0
TTI1 : TTI0 + TTI1 : Agc_gain_ref = 0-tti's gain
TTI2 : TTI1 + TTI2 : Agc_gain_ref = 1-tti's gain
TTI3 : TTI2 + TTI3 : Agc_gain_ref = 2-tti's gain $\overbrace{265}$
WINDOW SIZE = 4

TTI0 : TTI0
TTI1 : TTI0 + TTI1
TTI2 : TTI0 + TTI1 + TTI2
TTI3 : TTI0 + TTI1 + TTI2+ TTI3
Agc_gain_ref = 0-tti's gain Diff_Gain_Agc_gain(current tti's gain) - Agc_gain_ref

METHOD FOR ESTIMATING CHANNEL BY BASE STATION IN MOBILE COMMUNICATION SYSTEM AND DEVICE THEREFOR

TECHNICAL FIELD

The present disclosure relates to a mobile communication system and, more particularly, to a channel estimation method and device of a base station.

BACKGROUND ART

In general, a mobile communication system has been developed to provide voice service while guaranteeing the activity of a user. However, the mobile communication system gradually extends its scope up to data service in addition to voice and currently has been developed to the extent that it can provide high-speed data service. However, there is a need for a more advanced mobile communication system because there is a phenomenon in which resources are insufficient and users require a higher speed service in a current mobile communication system from which service is provided.

In line with such needs, a standard task for long term evolution (LTE) is in progress in the 3rd generation partnership project (3GPP) as one of systems being developed as a next-generation mobile communication system. LTE is a technology that implements communication based on a high-speed packet having a transfer rate of a maximum of about 100 Mbps. To this end, several schemes are being discussed. For example, there is a method of reducing the number of nodes located on a communication line by simplifying a network structure or a method of locating radio protocols close to a radio channel as close as possible.

Meanwhile, in accordance with a conventional technology, in transmission time interval (TTI) bundling, four subframes are contiguously allocated in the same resources. If channel estimation is performed for each subframe, a loss of performance may be generated because resources contiguously allocated to the four subframes temporally cannot be used.

DISCLOSURE OF INVENTION

Technical Problem

The present disclosure has been made in order to solve the above problems occurring in the related art, and an object of the present disclosure is to perform channel estimation using a signal accumulated by selecting a subframe to be used for the channel estimation based on moving speed of a terminal or a signal to noise ratio and applying weight to a reference signal in the selected subframe.

Solution to Problem

A method for a base station to estimate a channel according to the present disclosure for solving the problems includes the steps of continuously receiving at least one subframe, selecting the number of subframes to be used for channel estimation from the received subframe and extracting a subframe based on the number of subframes, and performing channel estimation using a reference signal in the extracted subframe.

Furthermore, a base station of the present disclosure for solving the problems includes a transceiver configured to communicates with a different network entity and a controller configured to continuously receive at least one subframe, select the number of subframes to be used for channel estimation from the received subframe and extract a subframe based on the number of subframes, and perform channel estimation using a reference signal in the extracted subframe.

Advantageous Effects of Invention

In accordance with the present disclosure, a base station can accumulate a reference signal based on moving speed of a terminal or a signal to noise ratio and perform channel estimation efficiently and accurately using the accumulated reference signal.

BRIEF DESCRIPTION OF DRAWINGS

FIG. 2c is a diagram showing a process of selecting a subframe in response to a window size.

BEST MODE

Figure 1:
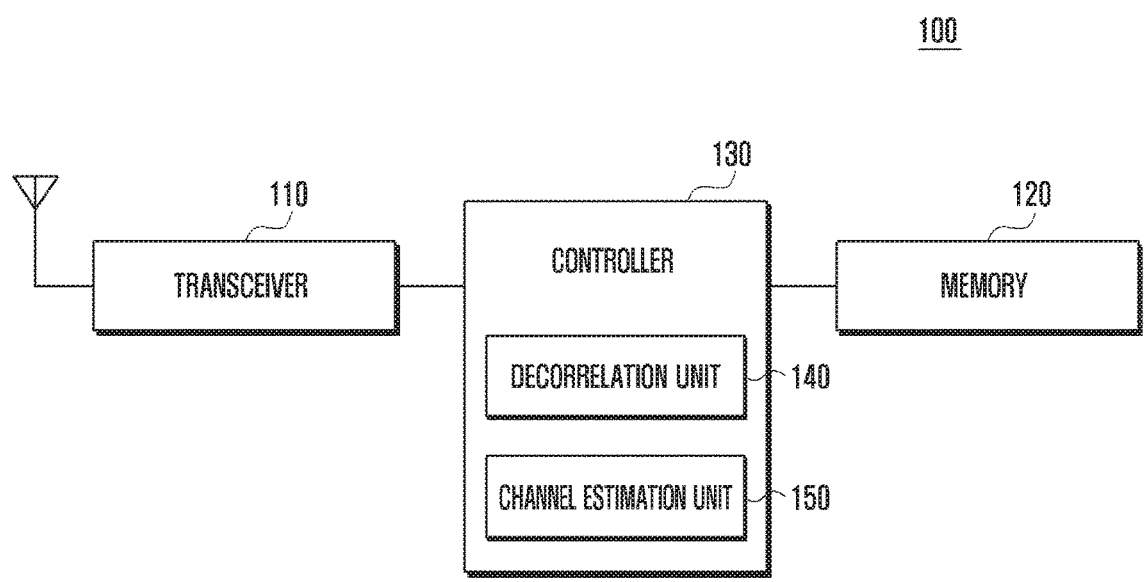
FIG. 1 is a diagram showing the internal configuration of a base station of the present disclosure.

Hereinafter, embodiments of the present disclosure are described in detail with reference to the accompanying drawings.

In describing the embodiments, a description of contents that are well known in the art to which the present disclosure pertains and not directly related to the present disclosure is omitted in order to make the gist of the present disclosure clearer.

For the same reason, in the accompanying drawings, some elements are enlarged, omitted, or depicted schematically. Furthermore, the size of each element does not accurately reflect its real size. In the drawings, the same or similar elements are assigned the same reference numerals.

In this specification, in describing the embodiments, a description of contents that are well known in the art to which the present disclosure pertains and not directly related to the present disclosure is omitted in order to make the gist of the present disclosure clearer.

For the same reason, in the accompanying drawings, some elements are enlarged, omitted, or depicted schematically. Furthermore, the size of each element does not accurately reflect its real size. In the drawings, the same or similar elements are assigned the same reference numerals.

The merits and characteristics of the present disclosure and a method for achieving the merits and characteristics will become more apparent from the embodiments described in detail in conjunction with the accompanying drawings. However, the present disclosure is not limited to the disclosed embodiments, but may be implemented in various different ways. The embodiments are provided to only complete the disclosure of the present disclosure and to allow those skilled in the art to understand the category of the present disclosure. The present disclosure is defined by the category of the claims. The same reference numerals will be used to refer to the same or similar elements throughout the drawings.

Hereinafter, the present disclosure is described with reference to the drawing for describing the present disclosure in connection with embodiments of the present disclosure.

FIG. 1 is a diagram showing the internal configuration of a base station of the present disclosure.

The base station 100 may include a transceiver 110 transceiving a signal, a memory 120 and a controller 130.

The transceiver 110 may perform communication with another network entity. The transceiver 110 may transmit and receive signals to and from a terminal scheduled in the base station. Alternatively, the transceiver 110 may receive an interference signal from a terminal located in another cell (hereinafter an interference terminal), and may transmit a signal to the interference terminal.

The memory 120 may store a signal received in the reference signal symbol (hereinafter a reference signal) of each slot of a subframe received in order to estimate a channel and a signal received in the data symbol of a subframe (hereinafter a data signal). Furthermore, the memory 220 may store a log likelihood ratio (LLR) calculated in a subframe.

The controller 130 may include a decorrelation unit 140 and a channel estimation unit 150. The configuration of the controller 130 is described in detail in FIG. 3.

Figure 2A:
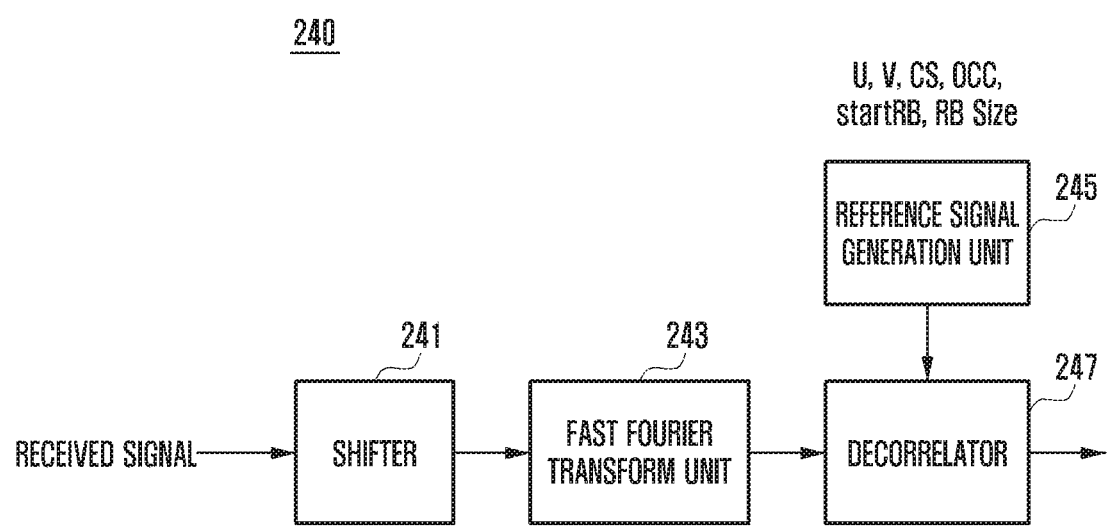
FIG. 2a is a diagram showing the configuration of a decorrelation unit 240 forming a controller 130 of FIG. 1.

FIG. 2a is a diagram showing the configuration of a decorrelation unit 240 forming the controller 130 of FIG. 1.

The decorrelation unit 240 may include a shifter 241, a fast Fourier transform (FFT) unit 243, a reference signal generation unit 245 and a decorrelator 247.

The shifter 241 functions to convert the frequency of a signal received from the transceiver 210.

The FFT unit 243 is an algorithm designed to reduce an operation number when discrete Fourier transform using an approximate formula is calculated based on Fourier transform. A signal whose frequency has been converted by the shifter 241 is subjected to Fourier transform by the FFT unit 243.

The reference signal generation unit 245 generates a reference signal using a parameter for generating the reference signal (hereinafter a reference signal parameter). The reference signal parameter may include a cell identifier u, the number of transport layers v, a cyclic shift (cs), an orthogonal sequence (occ), the start point of a resource block, the size of a resource block, etc.

The reference signal generation unit 245 may generate a reference signal using the reference signal parameter, and may send the generated reference signal to the decorrelator 247.

The decorrelator 247 that has received the reference signal may perform the decorrelation of the Fourier-transformed signal and the reference signal (a result value of the decorrelation of the Fourier-transformed signal and the reference signal is hereinafter called a decorrelation value). The decorrelator 247 may send the decorrelation value to the channel estimation unit 250.

Figure 2B:
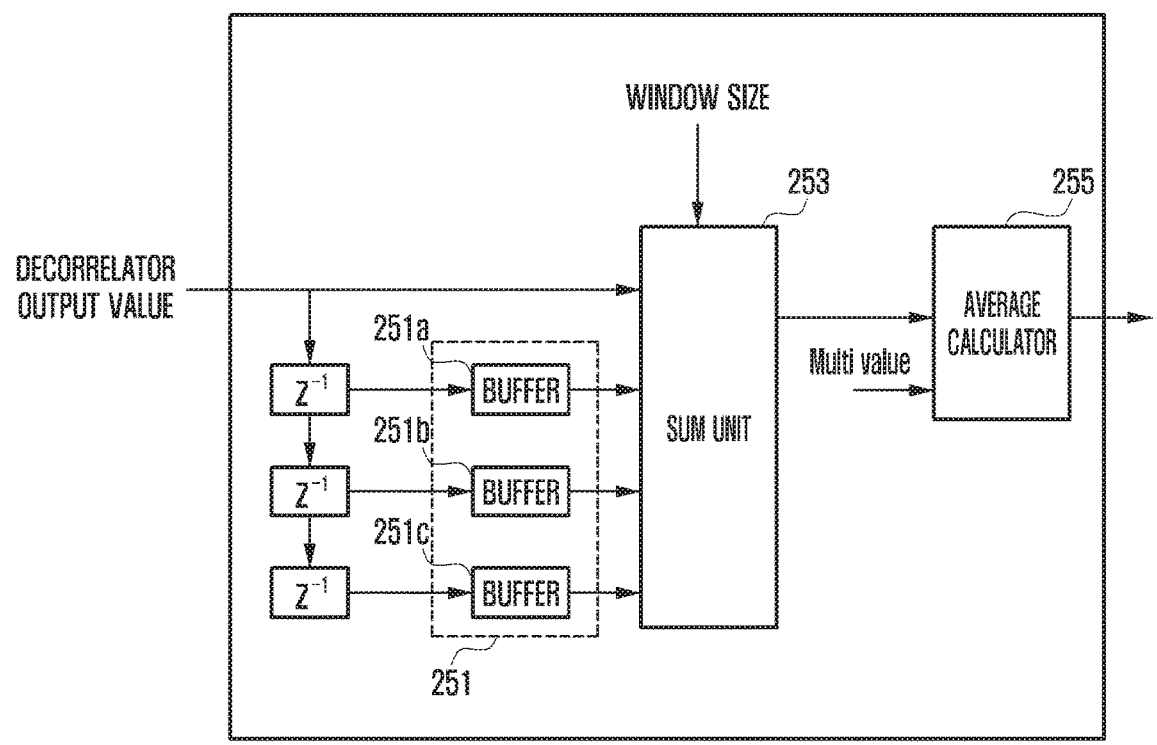
FIG. 2b is a diagram showing the configuration of a channel estimation unit 250 forming the controller 130 of FIG. 1.

FIG. 2b is a diagram showing the configuration of the channel estimation unit 250 forming the controller 130 of FIG. 1.

The channel estimation unit 250 may include a buffer 251, a sum unit 253 and an average calculator 255.

The buffer 251 may store a decorrelation value calculated by the decorrelator 247. Furthermore, the buffer 251 may store the decorrelation value of a previous subframe.

In this figure, the buffer 251a may store the decorrelation value of a subframe prior to a current subframe. Furthermore, the buffer 251b may store the decorrelation value of a second subframe prior to the current subframe. Furthermore, the buffer 251c may store the decorrelation value of a third subframe prior to the current subframe. Accordingly, in this figure, the sum unit 253 may receive the decorrelation values of a total of four subframes.

That is, the sum unit 253 may store the decorrelation values of a predetermined number of subframes, and the predetermined number may be changed.

The sum unit 253 may receive the decorrelation values of a predetermined number (for example, four) of subframes stored in the buffer. Alternatively, the sum unit 253 may receive the decorrelation values of some of a predetermined number (for example, four) of subframes stored in the buffer.

In this case, the sum unit 253 may receive a window size set in the controller 130, and may receive the decorrelation values of some of the predetermined number (for example, four) of subframes based on the window size. The window size may mean the number of subframes to be used for channel estimation and is set in the controller. A process of setting the window size is described below.

The controller 130 may set the window size using the signal to noise ratio of a terminal. For example, the controller 130 may set the window size largely in order to improve performance of channel estimation because the size of interference is small when the signal to noise ratio is low. On the contrary, the controller 130 may set the window size small in order to reduce the influence of interference because the size of interference is great when the signal to noise ratio is high.

Alternatively, the controller 130 may set the window size using speed of the terminal. For example, the controller 130 may set the window size small if the speed of the terminal is fast. However, a method of setting the window size is not limited to the described contents, and the controller 130 may set the window size based on various variables.

The sum unit 253 that has received the decorrelation values of some subframes based on a window size may calculate the sum of the decorrelation values. Alternatively, the sum unit 253 may add the received decorrelation values by multiplying them by weight. The weight may be determined by the controller 130 and transmitted to the sum unit 253. The weight may be calculated using a signal to noise ratio or a doppler frequency. The doppler frequency may mean speed of a terminal.

Detailed contents that the sum unit 253 adds the decorrelation values of some subframes using a window size are described in FIG. 2c.

The average calculator 255 calculates an average value of decorrelation values added by the sum unit 253. The average calculator 255 may calculate the average value by dividing the decorrelation values added by the sum unit 253 by a window size. Alternatively, the average calculator 255 may calculate the average value using the decorrelation values added by the sum unit 253 and a multi-value received from the average calculator 255.

The channel estimation unit 250 may perform channel estimation using an average value calculated by the average calculator 255.

FIG. 2c is a diagram showing a process of selecting a subframe in response to a window size.

In this figure, a TTI may mean a cycle for scheduling. In general, scheduling may be performed for each subframe. In the present disclosure, the length of a TTI and the length of a subframe may be used equally. Accordingly, a TTI0 may mean a subframe0.

The controller may estimate a channel using a subframe having a number corresponding to a window size.

If the window size is 1 (261), the controller 130 may perform channel estimation using one subframe. Accordingly, the controller may perform channel estimation using a TTI0 in the TTI0 that is a first subframe, using a TTI1 in the TTI1 that is a second subframe, a TTI2 in the TTI2 that is a third subframe, and a TTI3 in the TTI3 that is a fourth subframe. That is, if the window size is 1, the controller may perform channel estimation on each of the subframes.

If the window size is 2 (263), the controller 130 may perform channel estimation using two subframes. The controller performs channel estimation using a TTI0 because a single subframe is present in the TTI0 that is a first subframe. Furthermore, the controller may perform channel estimation using the TTI0 and a TTI1 in the TTI1 that is a second subframe, using a TTI2 and the TTI1 in the TTI2 that is a third subframe, and using a TTI3 and the TTI2 in the TTI3 that is a fourth subframe.

If the window size is 4 (265), the controller 130 may perform channel estimation using four subframes. However, the number of subframes that may be accumulated in the first, second and third subframes is less than 4, and the controller may perform channel estimation using the four subframes only in the fourth subframe. Accordingly, the controller 130 may perform channel estimation using all of subframes that may be accumulated in all of the subframes.

Figure 3:
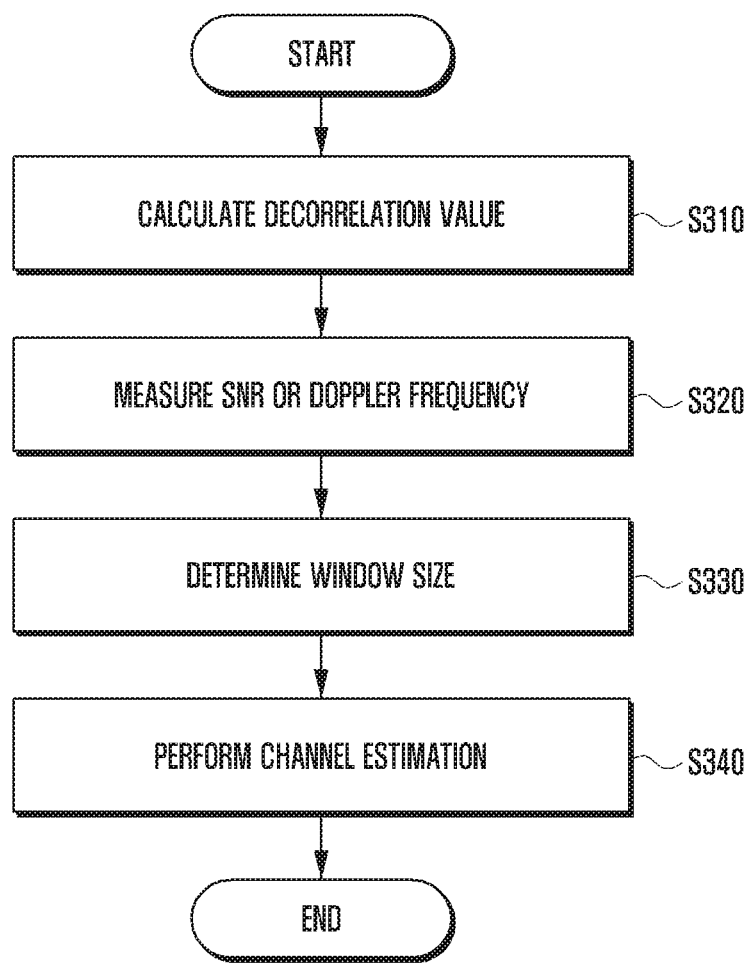
FIG. 3 is a flowchart showing a channel estimation process of the controller in the present disclosure.

FIG. 3 is a flowchart showing a channel estimation process of the controller in the present disclosure.

The controller generates a reference signal and performs frequency conversion and Fourier transform on a signal received in a symbol from which a reference signal is generated at step S310. Furthermore, the controller calculates the decorrelation value of the Fourier-transformed signal and the reference signal (hereinafter a decorrelation value).

The controller that has calculated the decorrelation value measures a signal to noise ratio or estimates a doppler frequency at step S320. The reason why the signal to noise ratio or the doppler frequency is estimated is for determining a window size.

The controller that has measured the signal to noise ratio or estimated the doppler frequency determines a window size based on the measured signal to noise ratio or the estimated doppler frequency at step S330. Specifically, the controller may determine the window size to be a great value if the size of the signal to noise ratio is small, and may determine the window size to be a small value if the size of the signal to noise ratio is great. Furthermore, the controller may determine the window size to be a small value if the size of the estimated doppler frequency is great, and may determine the window size to be a great value if the size of the estimated doppler frequency is small.

However, a method of determining the window size is not limited to the contents, and the window size may be determined using various variables.

The controller that has determined the window size may extract subframes based on the window size and perform channel estimation using the subframes at step S340. Specifically, the controller may perform channel estimation using an average of the decorrelation values of the extracted subframes. Alternatively, the controller may perform channel estimation using a value generated by applying weight to the decorrelation values of the extracted subframes. The controller may determine the weight using the signal to noise ratio or the doppler estimation value.

However, a method of performing channel estimation is not limited to the described contents and may include various embodiments.

Figure 4:
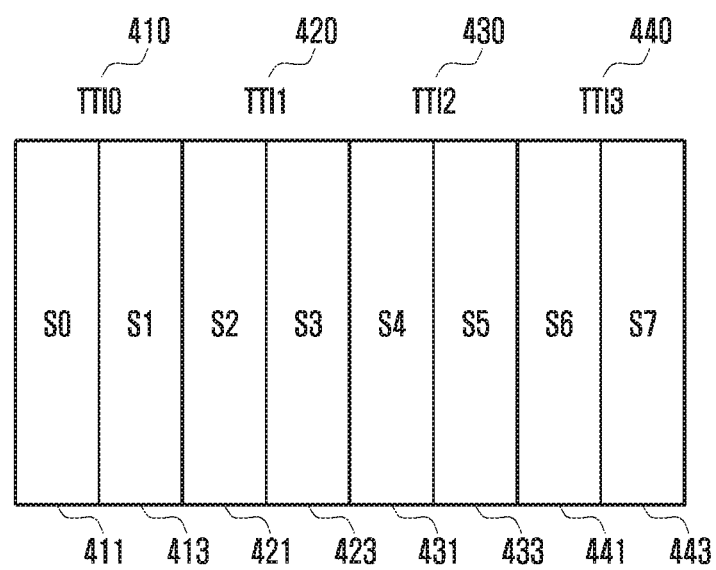
FIG. 4 is a diagram showing the allocation structure of subframes in TTI bundling.

FIG. 4 is a diagram showing the allocation structure of subframes in TTI bundling.

Referring to FIG. 4, in the TTI bundling, four subframes may be contiguously allocated in the same resources. Furthermore, each subframe includes two slots S0 and S1. In this figure, a TTI may mean a cycle for scheduling. In general, scheduling may be performed for each subframe. In the present disclosure, the length of a TTI and the length of a subframe may be used equally. FIG. 2c is described again using FIG. 4. If the window size is 2, the controller may perform channel estimation on a TTI0 410 only because a single subframe is present in the TTI0 410. Furthermore, the controller may estimate a channel using the TTI0 410 and a TTI1 420 in the TTI1 420 in response to the window size. Furthermore, the controller may estimate a channel using a TTI2 430 and the TTI1 420, that is, a previous TTI, in the TTI2 430.

Two embodiments may be taken into consideration in order to estimate a channel for each subframe in the present disclosure. A method of estimating a channel for each subframe is described below.

<First Embodiment>

In the present embodiment, the controller may store a signal received in the reference signal symbol (hereinafter a reference signal) of slots S0 411 and S1 413 included in the TTI0 410, that is, a first subframe, and a signal received in the data symbol of the subframe (hereinafter a data signal). Furthermore, the controller may calculate an LLR1, that is, a log likelihood ratio (LLR) in the TTI0, using the reference signal and the data signal, and may store the LLR1.

In the TTI1 420, that is, a second subframe, the controller may perform channel estimation using the reference signals in the slots S0 411 and S1 413 of the TTI0 410 and the slots S2 421 and S3 423 of the TTI1 420. Furthermore, the controller may calculate an LLR using the results of the channel estimation and a data signal in the TTI1 420 in order to improve channel estimation performance. Specifically, the controller may calculate a log likelihood ratio LLR2 by applying the results of the channel estimation to the data signal in the TTI1 420 and demodulating the applied results. Thereafter, the controller may add the log likelihood ratio LLR1 stored in the TTI0 and the log likelihood ratio LLR2 calculated in the TTI1. Furthermore, the controller may perform channel estimation by decoding the added log likelihood ratio LLR2'.

Furthermore, the controller may store the reference signal and data signal in the slots S2 421 and S3 423 of the TTI1 420 and the log likelihood ratio LLR2' added in the TTI1 420.

As described above, the controller performs channel estimation using an LLR calculated in a previous subframe, thereby being capable of increasing the accuracy of channel estimation.

In the TTI2 430, that is, a third subframe, the controller may perform channel estimation using the reference signals in the slots S0 411 and S1 413 of the TTI0 410, the slots S2 421 and S3 423 of the TTI1 420, and the slots S4 431 and S5 433 of the TTI2 430. Furthermore, in order to improve performance of channel estimation, the controller may calculate a log likelihood ratio LLR3 using the results of the channel estimation and a data signal in the TTI2 430. Specifically, the controller may calculate the log likelihood ratio LLR3 by applying the results of the channel estimation to the data signal in the TTI2 430 and demodulating the applied results. Thereafter, the controller may add the previously stored LLR2' and the calculated LLR3. The controller may perform channel estimation by decoding the added log likelihood ratio LLR3'.

Furthermore, the controller may store the reference signal and data signal in the slots S4 431 and S5 433 of the TTI2 430 and the log likelihood ratio LLR3' added in the TTI2 430.

In a TTI3 440, that is, a fourth subframe, the controller may perform channel estimation using the reference signals in the slots S0 411 and S1 413 of the TTI0 410, the slots S2 421 and S3 423 of the TTI1 420, the slots S4 431 and S5 433 of the TTI2 430, and the slots S6 441 and S7 443 of the TTI3 440. Furthermore, in order to improve performance of channel estimation, the controller may calculate a log likelihood ratio LLR4 using the results of the channel estimation and a data signal in the TTI3 440. Specifically, the controller may calculate the log likelihood ratio LLR4 by applying the results of the channel estimation to the data signal in the TTI3 440 and demodulating the applied results. The controller may add the log likelihood ratio LLR3' stored in the previous TTI2 and the calculated LLR4. The controller may perform channel estimation by decoding the added log likelihood ratio LLR4'.

In summary, the first embodiment can improve performance of channel estimation by accumulating and using a log likelihood ratio (LLR) generated by applying the results of channel estimation updated in each subframe to the data symbol of a current subframe and demodulating the applied results and a log likelihood ratio (LLR) stored in a previous subframe.

<Second Embodiment>

In the present embodiment, the controller performs the same operation as that of the first embodiment in the TTI0 410, that is, the first subframe. That is, the controller may store a signal received in the reference signal symbol (hereinafter a reference signal) of the slots S0 411 and S1 413 and a signal received in the data symbol of the subframe (hereinafter a data signal). Furthermore, the controller may calculate an LLR1, that is, a log likelihood ratio (LLR) in the TTI0, using the reference signal and the data signal, and may store the LLR1.

In the TTI1 420, that is, the second subframe, the controller may perform channel estimation using the reference signals in the slots S0 411 and S1 413 of the TTI0 410 and the slots S2 421 and S3 423 of the TTI1 420. Furthermore, in order to improve performance of channel estimation, the controller may recalculate (LLR1') the LLR in the first subframe using the results of the channel estimation and the data signal in the TTI0 410. Specifically, the controller may calculate the log likelihood ratio LLR1' by applying the results of the channel estimation to the data signal in the previous subframe TTI0 and demodulating the applied results. Furthermore, the controller may calculate a log likelihood ratio LLR2 by applying the results of the channel estimation to the data signal in the current subframe TTI1 and demodulating the applied results. Thereafter, the controller may add the calculated LLR1' and LLR2. The controller may perform channel estimation by decoding the added log likelihood ratio LLR2'.

The present embodiment is different from the first embodiment in that an LLR stored in a previous subframe is not used, an LLR is recalculated using the results of updated channel estimation and the data signal of the previous subframe and the LLR and the LLR of a current subframe are added.

Furthermore, the controller may store the reference signal and data signal in the slots S2 421 and S3 423 of the TTI1 420 and the log likelihood ratio LLR2' added in the TTI1 420.

In the TTI2 430, that is, the third subframe, the controller may perform channel estimation using the reference signals in the slots S0 411 and S1 413 of the TTI0 410, the slots S2 421 and S3 423 of the TTI1 420, and the slots S4 431 and S5 433 of the TTI2 430. Furthermore, in order to improve performance of channel estimation, the controller may recalculate a log likelihood ratio LLR12' in the TTI0 and TTI1 using the results of the channel estimation and the data signals in the TTI0 410 and TTI1 420. Specifically, the controller may calculate the log likelihood ratio LLR12' by applying the results of the channel estimation to the data signals in the previous subframes TTI0 and TTI1 and demodulating the applied results. Furthermore, the controller may calculate a log likelihood ratio LLR3 by applying the results of the channel estimation to the data signal in the current subframe TTI2 and demodulating the applied results. Thereafter, the controller may add the calculated log likelihood ratios LLR12' and LLR3. The controller may perform channel estimation by decoding the added log likelihood ratio LLR3'.

Furthermore, the controller may store the reference signal and data signal in the slots S4 431 and S5 433 of the TTI2 430 and the log likelihood ratio LLR3' added in the TTI2 430.

In the TTI3 440, that is, the fourth subframe, the controller may perform channel estimation using the reference signals in the slots S0 411 and S1 413 of the TTI0 410, the slots S2 421 and S3 423 of the TTI1 420, the slots S4 431 and S5 433 of the TTI2 430, and the slots S6 441 and S7 443 of the TTI3 440. Furthermore, in order to improve performance of channel estimation, the controller may calculate a log likelihood ratio LLR123' using the results of the channel estimation and the data signals in the TTI0 410, the TTI1 420 and the TTI2 430, and may add the calculated log likelihood ratio LLR123' and the log likelihood ratio LLR4 of the current subframe TTI3. The controller may perform channel estimation by decoding the added log likelihood ratio LLR4'.

In summary, the second embodiment can improve performance of channel estimation by accumulating and using a log likelihood ratio (LLR) generated by applying the results of channel estimation updated in each subframe to the data signal of a previous subframe again and demodulating the applied results and a log likelihood ratio (LLR) generated by applying the results of the channel estimation to the data symbol of a current subframe and demodulating the applied results.

As described above, the controller accumulates and uses the results of channel estimation in each subframe, thereby being capable of improving performance of channel estimation.

In this case, it will be understood that each block of the flowchart illustrations and combinations of the blocks in the flowchart illustrations can be executed by computer program instructions. These computer program instructions may be mounted on the processor of a general purpose computer, a special purpose computer, or other programmable data processing apparatus, so that the instructions executed by the processor of the computer or other programmable data processing apparatus create means for executing the functions specified in the flowchart block or blocks. These computer program instructions may also be stored in computer-usable or computer-readable memory that can direct a computer or other programmable data processing equipment to function in a particular manner, such that the instructions stored in the computer-usable or computer-readable memory produce an article of manufacture including instruction means that implement the function specified in the flowchart block or blocks. The computer program instructions may also be loaded into a computer or other programmable data processing apparatus to cause a series of operational steps to be performed on the computer or other programmable apparatus to produce a computer-executed process, so that the instructions performing the computer or other programmable apparatus provide steps for executing the functions described in the flowchart block or blocks.

Furthermore, each block of the flowchart illustrations may represent a portion of a module, a segment, or code, which includes one or more executable instructions for implementing a specified logical function(s). It should also be noted that in some alternative implementations, the functions noted in the blocks may occur out of order. For example, two blocks shown in succession may in fact be executed substantially concurrently, or the blocks may sometimes be executed in the reverse order, depending upon the functionality involved.

In this case, the term "unit" used in the present embodiment means, but is not limited to, a software or hardware component, such as a field programmable gate array (FPGA) or an application-specific integrated circuit (ASIC), which performs specific tasks. The "unit" may advantageously be configured to reside on an addressable storage medium and configured to operate on one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operation on one or more CPUs within a device or a security multimedia card.

Those skilled in the art to which the present disclosure pertains will appreciate that the present disclosure may be implemented in other detailed forms without departing from the technological spirit or essential characteristics of the present disclosure. Accordingly, the aforementioned embodiments should be understood as being only illustrative, but should not be understood as being restrictive from all aspects. The range of right of the present disclosure is defined by the following claims rather than the detailed description, and the meanings and scope of the claims and all changes or modified forms derived from their equivalents should be construed as falling within the range of right of the present disclosure.

Meanwhile, the preferred embodiments of the present disclosure have been disclosed in this specification and drawings, and specific terms are used therein, but they are used as common meanings in order to clarify the technological contents of the present disclosure and help understanding of the present disclosure, but are not intended to limit the scope of the present disclosure. It will be evident to those skilled in the art that various implementations based on the technological spirit of the present disclosure are possible in addition to the disclosed embodiments.

The invention claimed is:

1. A method for a base station to estimate a channel in uplink, the method comprising:
    determining a duration of subframes in a transmission time interval (TTI) bundling to be used to estimate a channel between a terminal and the base station;
    estimating the channel based on reference signals received in the duration of subframes; and
    determining a log likelihood ratio (LLR) based on a result of the channel estimation and data symbols of at least one of the subframes,
    wherein the estimating of the channel comprises calculating a sum of results of decorrelation of the reference signals received in the duration of the subframes.

2. The method of claim 1, wherein the duration is determined based on at least one of speed of the terminal or a signal to noise ratio.

3. The method of claim 1, wherein the calculating of the sum of the results of the decorrelation comprises adding the results of the decorrelation and a production of weight.

4. The method of claim 3, wherein the weight is selected based on at least one of a doppler frequency or a signal to noise ratio.

5. The method of claim 1, wherein the determining of the LLR further comprises determining the LLR using a sum of an LLR of a current subframe and an LLR stored in at least one previous subframe of the subframes.

6. The method of claim 1,
    wherein the determining of the LLR comprises determining the LLR using a sum of an LLR of a current subframe and an LLR using the result of the channel estimation and data symbols of at least one previous subframe of the subframes, and
    wherein data symbols of the current subframe are the same as the data symbols of the at least one previous subframe.

7. A base station for channel estimation in uplink, comprising:
    a transceiver; and
    a controller configured to:
        determine a duration of subframes in a transmission time interval (TTI) bundling to be used to estimate a channel between a terminal and the base station,
        estimate the channel based on reference signals received in the duration of the subframes, and
        determine a log likelihood ratio (LLR) based on a result of the channel estimation and data symbols of at least one of the subframes,
    wherein the controller is further configured to calculate a sum of results of decorrelation of the reference signals in the duration of the subframes.

8. The base station of claim 7, wherein the controller is further configured to determine the duration based on at least one of speed of the terminal or a signal to noise ratio.

9. The base station of claim 7, wherein the controller is further configured to calculate the sum of the results of the decorrelation by adding the results of the decorrelation and a production of weight.

10. The base station of claim 9, wherein the weight is selected based on at least one of a doppler frequency or a signal to noise ratio.

11. The base station of claim 7, wherein the controller is further configured to determine the LLR using a sum of an LLR of a current subframe and an LLR stored in a previous subframe of the subframes.

12. The base station of claim 7,
wherein the controller is further configured to determine the LLR using a sum of an LLR of a current subframe and an LLR using the result of the channel estimation and data symbols of at least one previous subframe of the subframes, and
wherein data symbols of the current subframe are the same as the data symbols of the at least one previous subframe.

\* \* \* \* \*